United States Patent Office 2,814,616
Patented Nov. 26, 1957

2,814,616
MONOAZO DYESTUFFS

Raymond Gunst, Binningen, Switzerland, assignor to Ciba Limited, Basel, Switzerland, a Swiss firm No Drawing. Application July 5, 1955,
Serial No. 520,100

Claims priority, application Switzerland July 9, 1954

10 Claims. (Cl. 260—193)

The present invention relates to new monoazo dyestuffs which, as exemplified by the dyestuff of the constitution (1)

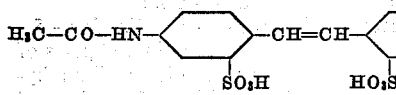
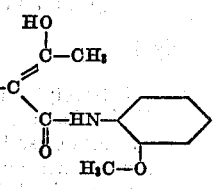

correspond to the general formula:

(2)

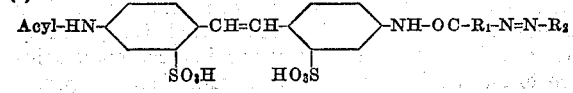

in which $R_1$ indicates a benzene radical and $R_2$ a radical of an acetoacetylaminobenzene which is free from water solubilizing groups, and in which formula the groups —NH—CO— and —N=N— are in p-position to one another.

The invention also provides a process of manufacture of the new dyestuffs, wherein diazo compounds of amines of the general formula:

(3)

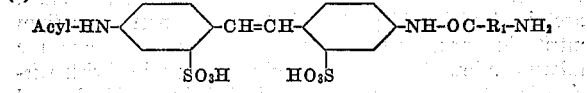

in which $R_1$ indicates a benzene radical and the $NH_2$— group is in p-position to the —NH—OC— group, are coupled with acetoacetylaminobenzenes free from solubilizing groups.

The amines of the Formula 3 can be prepared by acylation of 4-acylamino-4′-aminostilbene-2:2′-disulfonic acids with an acylating agent which provides the radical —OC—$R_1$—$NO_2$ (in which $R_1$ has the above significance) and reduction of the nitro group. These reactions can be carried out in the manner known per se. There are used with advantage in this case such 4-acylamino-4′-aminostilbene-2:2′-disulfonic acids of which the acyl radical is a low molecular aliphatic radical, for example a butyryl, propionyl, formyl or especially an acetyl radical or a benzoyl radical. The benzene nucleus of the benzoyl radical can also contain substituents, for example halogen atoms, such as chlorine, or methyl, ethyl, methoxy or ethoxy groups.

As acylating agents which provide the radical

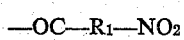

there are used for example benzoyl chlorides which contain in p-position to the carboxylic acid chloride group a nitro group and can also contain further substituents, such as low molecular alkyl groups. As examples may be mentioned:

4-nitrobenzoyl chloride,
3-methyl-4-nitrobenzoyl chloride,
3-chloro-4-nitrobenzoyl chloride.

As coupling components there are used in the present process acetoacetylaminobenzenes which are free from water-solubilizing groups. The benzene nuclei of these compounds which are attached to the —NH— groups advantageously also contain at least one further substituent. As substituents there are concerned here, for example, low molecular alkyl or alkoxy groups, such as methyl, ethyl, methoxy or ethoxy groups, halogen atoms, such as bromine or chlorine, or acetylamino groups. Especially good results are obtained in general with acylacetylaminobenzenes which contain, preferably in o-position to the —NH— group, a low molecular alkoxy group, for example an ethoxy or more especially a methoxy group. As examples of coupling components for the present process the following compounds may be mentioned:

Acetoacetylaminobenzene,
1-acetoacetylamino-2-chlorobenzene,
1-acetoacetylamino-2-methoxybenzene,
1-acetoacetylamino-4-methoxybenzene,
1-acetoacetylamino-2-methoxy-5-methylbenzene,
1-acetoacetylamino-2:4-dimethylbenzene,
1-acetoacetylamino-2:5-dimethoxybenzene,
1-acetoacetylamino-2-methoxy-4-chloro-5-methylbenzene,
1-acetoacetylamino-2-ethoxy-4-chloro-5-methylbenzene,
1-acetoacetylamino-2-methoxy-4-bromo-5-methylbenzene,
1-acetoacetylamino-2-ethoxy-4-bromo-5-methylbenzene,
1-acetoacetylamino-2-chloro-4-acetamino-5 - methoxybenzene.

The diazotization of the amines of the Formula 3 advantageously takes place by the so called indirect method, i. e., in which a solution of an alkali salt of the diazo component, containing a slight excess of alkali and also the necessary quantity of alkali nitrite, is combined with an excess of hydrochloric acid. The coupling can take place in weak acid, neutral or alkaline medium, for example alkaline with alkali bicarbonate or alkali carbonate.

The resulting new monoazo dyestuffs of the Formula 2 are suitable for the printing and especially for the dyeing of a variety of materials, for example such of animal origin, such as wool, silk and leather, but especially cellulosic fibers, such as cotton, linen, artificial silk or staple fiber from regenerated cellulose. They provide very pure, so called greenish yellow dye shades, take very well on cellulose fibers and yield dyeings with fastness properties, such as could not be obtained with known dyestuffs of similar constitution and likewise of greenish yellow shades. The dyeings are in addition of good dischargeability with alkaline agents used in printing.

The mentioned advantages are shown especially in comparison with the dyestuffs described in German Patents Nos. 293,333 and 470,652 and U. S. Patent No. 2,657,202 dated October 27, 1953, to E. Moser. These known products of which some have attained to a remarkable practical importance, are prepared by coupling diazotized 2-(aminophenyl)-benzthiazole disulfonic acids with acetoacetylaminobenzenes, by coupling diazotized 2-(aminophenyl)-benzthiazole monosulfonic acids with acetoacetylaminobenzene sulfonic acids or by sulfonation of monoazo dyestuffs prepared from diazotized 2-(aminophenyl)-benzthiazole monosulfonic acids and acetoacetylaminobenzenes. They likewise give on cellulose fibers pure greenish yellow shades. On account of this property they have been used in practice in spite of the fact that their dyeing capacity and fastness properties to wet processing, including the dyestuffs of the most recent of these three patents are only able to satisfy modest requirements. Compared with these known products the new dyestuffs obtainable according to the process of the present invention exhibit a better dyeing capacity, better fastness to wet processing and in some cases also a better fastness to light.

The following examples illustrate the invention, the parts being by weight unless otherwise stated and the relation between part by weight and part by volume being the same as that between the kilogram and the liter:

Example 1

57.5 parts of the sodium salt of 4-acetylamino-4'-(4''-aminobenzoylaminostilbene)-2:2'-disulfonic acid are dissolved in 300 parts of hot water, 7 parts of sodium nitrite in concentrated aqueous solution are added and the mixture is allowed to flow in a thin stream with brisk stirring into 30 parts by volume of 30% hydrochloric acid which has been diluted with water, the temperature being maintained at 20° C. by the addition of ice. After 3 hours, the diazo suspension is filtered off, stirred again into water and allowed to run at room temperature with good stirring into a solution of 21 parts of 1-acetoacetylamino-2-methoxybenzene, 13.5 parts of 30% sodium hydroxide solution and 30 parts of sodium carbonate in 300 parts of water. After the addition of sodium chloride, the dyestuff formed is completely separated and filtered off. It forms a yellow powder which dissolves in water with a yellow color. It dyes cellulose fiber in very clear, greenish yellow shades which are distinguished by good fastness to wet processing and very good fastness to light.

The 4 - acetylamino - 4' - (4'' - aminobenzoylaminostilbene) - 2:2' - disulfonic acid used as diazo component can be prepared as follows:

40 parts of 4-nitro-4'-aminostilbene-2:2'-disulfonic acid are dissolved with the addition of 13 parts of 30% sodium hydroxide solution. The reaction should only be weakly alkaline to Brilliant Yellow. 17 parts of acetic anhydride are added dropwise fairly rapidly at 70° C. The acetylation is complete after a short time. The nitro compound is reduced in an iron reducing vessel with iron filings and acetic acid in the known manner to the amino compound. The iron compounds which are dissolved are precipitated from the reaction mixture by addition of sodium carbonate to a distinctly alkaline reaction as iron hydroxide and filtered off. The alkaline filtrate is condensed with 4-nitrobenzoyl chloride by dissolving 20 parts of 4-nitrobenzoyl chloride in 20 parts of acetone and running the solution at 40–45° C. in a fine stream with brisk stirring into the filtrate. For completion of the condensation, the reaction mixture is heated for a further hour to 70° C. The 4 - acetylamino - 4' - nitrobenzoylaminostilbene-2:2'-disulfonic acid is completely precipitated and is filtered off. For conversion into the amino compound the product is again reduced in the known manner with iron and acetic acid.

Example 2

57.5 parts of 4 - acetylamino - 4' - (4'' - aminobenzoylaminostilbene)-2:2'-disulfonic acid sodium salt are diazotized as described in Example 1. For coupling 27.2 parts of 1 - acetoacetylamino - 2:5 - dimethoxy - 4 - chlorobenzene are dissolved in 250 parts of water with the addition of 13.5 parts of 30% sodium hydroxide solution and 20 parts of crystalline sodium acetate are added. The diazo suspension is run at room temperature with good stirring into the solution of the coupling component. After about 1 hour's stirring there is slowly added dropwise a 10% aqueous solution of sodium carbonate until the reaction mixture reacts weakly alkaline to Brilliant Yellow paper. The whole is then heated to 30° C. and stirred for about another 2 hours. The dyestuff formed is precipitated completely by addition of sodium chloride, filtered off and dried. It forms a yellow powder which dissolves in water with a yellow color. It dyes cellulose fiber in very clear, greenish yellow shades which are especially distinguished by good fastness to wet processing and good fastness to light.

Example 3

The diazo suspension of 57.5 parts of the sodium salt of 4 - acetylamino - 4' - (4'' - aminobenzoylaminostilbene)-2:2'-disulfonic acid is mixed with brisk stirring with a weak acetic acid suspension of 30 parts of 1-acetoacetylamino - 4 - acetylamino - 5 - methoxy - 2 - chlorobenzene which has been prepared as follows:

30 parts of 1 - acetoacetylamino - 4 - acetylamino - 5 - methoxy - 2 - chlorobenzene are dissolved in 400 parts of water with addition of 13.5 parts of 30% sodium hydroxide solution. By dropwise addition of acetic acid with very strong stirring until the reaction is distinctly acid to litmus, the acetoacetylarylide is precipitated again in a very fine reactive form. After mixing with the diazo suspension, the temperature of the reaction mixture is increased with brisk stirring within 1 hour to 40–50° C. and then maintained for 4 hours at this temperature. For separation of the dyestuff formed the whole is adjusted by the dropwise addition of aqueous sodium carbonate solution to an alkaline reaction to Brilliant Yellow paper, a little sodium chloride added and filtration then carried out. The new dyestuff forms a yellow powder which dissolves in water with a yellow color and dyes cellulose fiber in very clear greenish yellow shades which are distinguished by very good fastness to wet processing and good fastness to light.

Example 4

63.7 parts of the sodium salt of 4 - benzoylamino - 4' - (4'' - aminobenzoylaminostilbene) - 2:2' - disulfonic acid are dissolved in 350 parts of hot water, 7 parts of sodium nitrite in concentrated aqueous solution added and the mixture allowed to run in a thin stream with brisk stirring into 30 parts by volume of 30% hydrochloric acid which has been diluted with water. By addition of ice the temperature is maintained at 20° C. After 3 hours, the diazo compound is filtered off and stirred again into water. For coupling, a solution is prepared of 30 parts of 1-acetoacetylamino - 4 - acetylamino - 5 - methoxy - 2 - chlorobenzene, 13.5 parts of 30% sodium hydroxide solution and 30 parts of anhydrous sodium carbonate in 300 parts of water. The diazo suspension is allowed to flow slowly in a thin stream with brisk stirring at room temperature into the solution of the coupling component. The dyestuff formed can be separated by addition of a little sodium chloride and isolated by filtration. It forms a yellow powder which dissolves in water with a yellow color. It dyes very well on cellulose fibers and gives very clear, greenish yellow shades which are distinguished by good fastness to wet processing and good fastness to light.

In the following table further dyestuffs are indicated which can be prepared in the same manner and possess similar properties to the dyestuffs described in the previous examples. They dye cellulose fibers in greenish yellow shades. The dyeings are distinguished primarily by good fastness to wet processing.

| | Diazo component Acyl-HN-⟨⟩-CH=CH-⟨⟩-NH-OC-R₁-NH₂ (SO₃H) (HO₃S) | | Coupling component H₃C-OC-H₂C-OC-HN-R |
|---|---|---|---|
| | Acyl radical | Radical —OC—R₁—NH₂ | Radical —HN—R |
| 1 | ⟨⟩-CO— | —OC-⟨⟩-NH₂ | —HN-⟨⟩ (H₃CO) |
| 2 | ⟨⟩-CO— | —OC-⟨⟩-NH₂ | —HN-⟨⟩ (NH—OC—CH₃) (H₃CO) |
| 3 | H₃CO-⟨⟩-CO— | —OC-⟨⟩-NH₂ | —HN-⟨⟩ (H₃CO) |
| 4 | Cl-⟨⟩-CO— | —OC-⟨⟩-NH₂ | —HN-⟨⟩-NH—OC—CH₃ (Cl) (OCH₃) |
| 5 | H₃C—CH₂—CO | —OC-⟨⟩-NH₂ | —HN-⟨⟩ (H₃CO) |
| 6 | ⟨⟩-CO— | —OC-⟨⟩-NH₂ (CH₃) | —HN-⟨⟩-NH—OC—CH₃ (Cl) (OCH₃) |
| 7 | Cl-⟨⟩-CO— | —OC-⟨⟩-NH₂ | —HN-⟨⟩ (Cl) |

*Example 5*

100 parts of cotton are entered at 50° C. into a dye bath which contains in 3,000 parts of water 1 part of the dyestuff obtained according to paragraph 1 of Example 1 and 2 parts of anhydrous sodium carbonate, the temperature is raised within half an hour to 90° C. and 30 parts of crystalline sodium sulfate are added. Dyeing is then carried out for 1 hour at 90–95° C. and a pure greenish yellow dyeing obtained of very good fastness to light and good fastness to wet processing.

What is claimed is:

1. A monoazo dyestuff of the formula

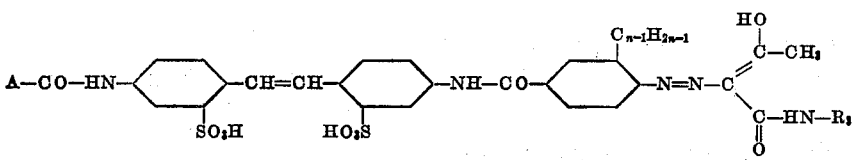

in which A indicates a member selected from the group consisting of an alkyl radical containing at the most three carbon atoms and an aromatic radical containing a single ring, said single ring being a six-membered carbocyclic ring, $R_1$ and $R_3$ each indicates an aromatic radical containing a single ring, said single ring being a six-membered carbocyclic ring, $n$ indicates a whole number of at the most 2, A, $R_1$ and $R_3$ are free from water-solubilizing groups and the groups —NH—CO— and —N=N— are in para-position to one another.

2. A monoazo dyestuff of the formula

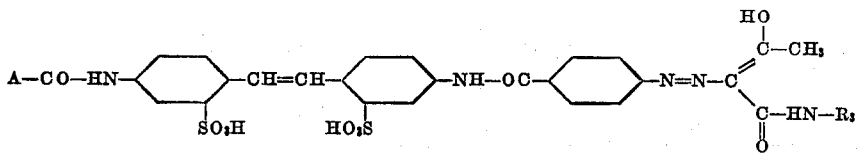

in which A indicates an alkyl radical containing at the most two carbon atoms and $R_3$ indicates an aromatic radical free from water-solubilizing groups and containing a single ring, said single ring being a six-membered carbocyclic ring.

3. A monoazo dyestuff of the formula

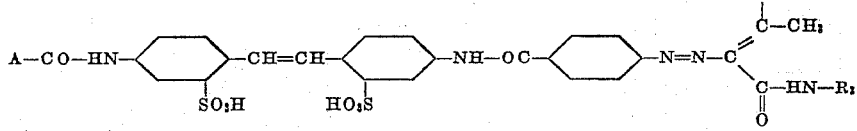

in which A and $R_3$ each indicates an aromatic radical free from water-solubilizing groups and containing a single ring, said single ring being a six-membered carbocyclic ring.

4. A monoazo dyestuff of the formula

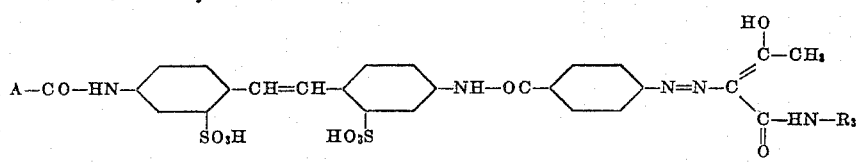

in which A indicates an alkyl radical containing at the most two carbon atoms and $R_3$ indicates an aromatic radical free from water-solubilizing groups and containing a single ring, said single ring being a six-membered carbocyclic ring and the radical $R_3$ contains a methoxy group.

5. A monoazo dyestuff of the formula

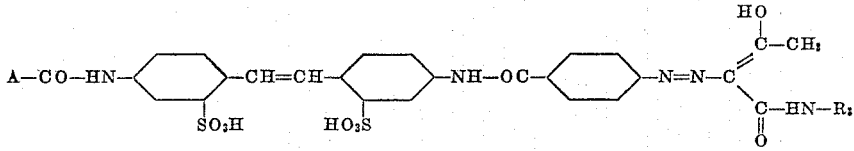

in which A and $R_3$ each indicates an aromatic radical free from water-solubilizing groups and containing a single ring, said single ring being a six-membered carbocyclic ring and the radical $R_3$ contains a methoxy group.

6. The monoazo dyestuff of the formula

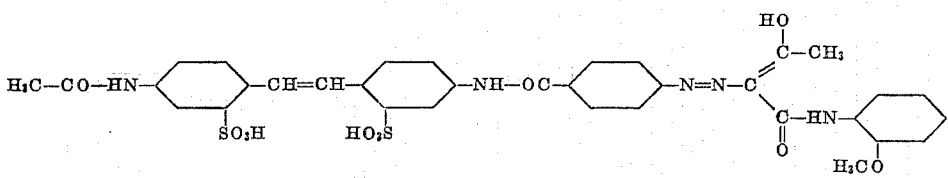

7. The monoazo dyestuff of the formula

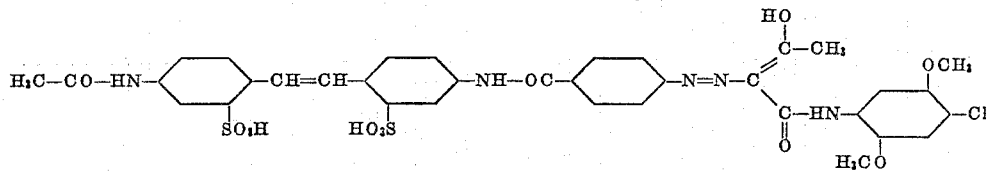

8. The monoazo dyestuff of the formula

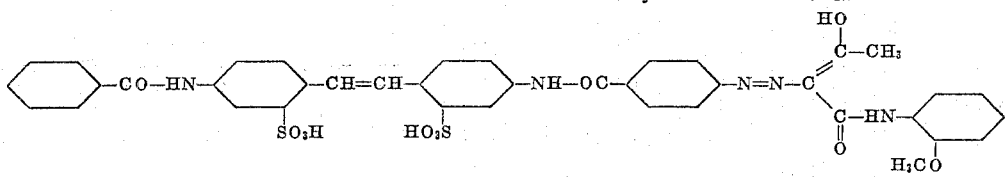

9. The monoazo dyestuff of the formula

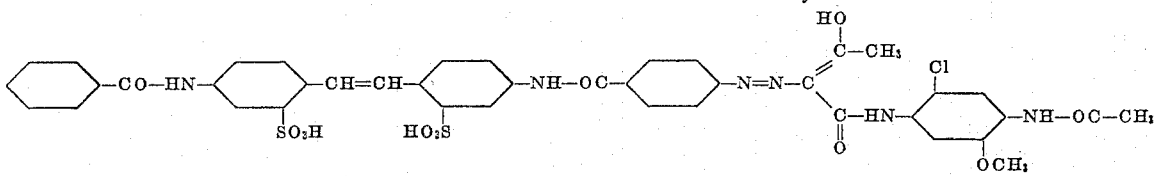

10. The monoazo dyestuff of the formula

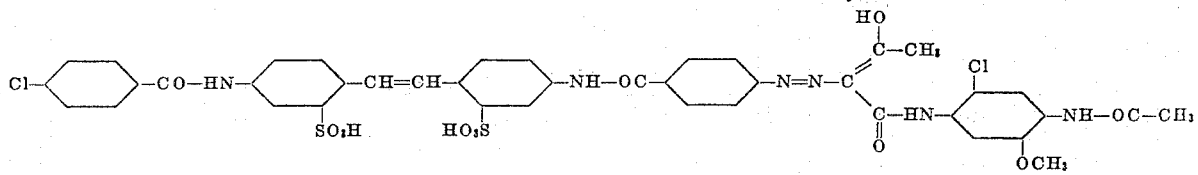

References Cited in the file of this patent
UNITED STATES PATENTS

| | | |
|---|---|---|
| 2,115,412 | Dahlen et al. | Apr. 26, 1938 |
| 2,714,587 | Neier et al. | Aug. 2, 1955 |